United States Patent
Wu et al.

(10) Patent No.: US 12,447,867 B2
(45) Date of Patent: Oct. 21, 2025

(54) METHOD, APPARATUS, DEVICE, AND SYSTEM FOR PROCESSING ASYNCHRONOUS MOTOR, AND TRANSPORTATION MEANS

(71) Applicant: Huawei Digital Power Technologies Co., Ltd., Shenzhen (CN)

(72) Inventors: Chaoqiang Wu, Shenzhen (CN); Mengxuan Lin, Dongguan (CN); Chaojie Shi, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 18/460,062

(22) Filed: Sep. 1, 2023

(65) Prior Publication Data

US 2023/0406156 A1 Dec. 21, 2023

Related U.S. Application Data

(63) Continuation of application No. PCT/CN2021/078864, filed on Mar. 3, 2021.

(51) Int. Cl.
| | | |
|---|---|---|
| *B60L 58/27* | (2019.01) | |
| *H01M 10/615* | (2014.01) | |
| *H01M 10/625* | (2014.01) | |
| *H01M 10/656* | (2014.01) | |
| *H02P 29/62* | (2016.01) | |

(52) U.S. Cl.
CPC ........... *B60L 58/27* (2019.02); *H01M 10/615* (2015.04); *H01M 10/625* (2015.04); *H01M 10/656* (2015.04); *H02P 29/62* (2016.02); *B60L 2240/545* (2013.01); *B60L 2250/00* (2013.01); *H01M 2220/20* (2013.01); *H02P 2207/01* (2013.01)

(58) Field of Classification Search
CPC .............. B60L 58/27; B60L 2240/545; B60L 2250/00; H01M 10/615; H01M 10/625; H01M 10/656; H01M 2220/20; H02P 29/06; H02P 2207/01
See application file for complete search history.

(56) References Cited

U.S. PATENT DOCUMENTS

| | | | |
|---|---|---|---|
| 2010/0050676 A1 | 3/2010 | Takamatsu et al. | |
| 2014/0015461 A1 | 1/2014 | Ohba et al. | |
| 2020/0350796 A1* | 11/2020 | Yang | H02K 1/274 |
| 2022/0158574 A1* | 5/2022 | Hao | B60L 58/27 |

FOREIGN PATENT DOCUMENTS

| | | |
|---|---|---|
| CN | 103580582 A | 2/2014 |
| CN | 110048192 A | 7/2019 |
| CN | 111347936 A | 6/2020 |
| CN | 111355433 A | 6/2020 |

* cited by examiner

*Primary Examiner* — Zoheb S Imtiaz
(74) *Attorney, Agent, or Firm* — Conley Rose, P.C.

(57) ABSTRACT

A method for processing an asynchronous motor includes obtaining indication trigger information; and injecting, in response to the indication trigger information, a first current into a stator winding of the asynchronous motor, where the first current is for generating heat without a torque for the asynchronous motor, and the heat heats a battery pack through a heat exchanger.

20 Claims, 6 Drawing Sheets

METHOD, APPARATUS, DEVICE, AND SYSTEM FOR PROCESSING ASYNCHRONOUS MOTOR, AND TRANSPORTATION MEANS

CROSS-REFERENCE TO RELATED APPLICATIONS

This application is a continuation application of International Patent Application No. PCT/CN2021/078864 filed on Mar. 3, 2021, which is hereby incorporated by reference in its entirety.

TECHNICAL FIELD

This application relates to the field of motor control, and in particular, to a method, an apparatus, a device, and a system for processing an asynchronous motor, and a transportation means.

BACKGROUND

With increasing pressure on energy and environmental protection, new energy vehicles become a development direction of future vehicles. A range capability of the new energy vehicle (for example, a new energy electric vehicle) is one of key indicators. In an environment with a relatively low temperature, a range capability of the new energy electric vehicle greatly decreases. A main cause is that charging and discharging performance of a battery pack degrades due to an increase in an electrolyte viscosity of the battery pack at the low temperature. At −10 degrees Celsius (° C.), a capacity and a working voltage of a commonly used lithium-ion power battery of the electric vehicle decrease significantly. At −20° C., performance further degrades with a sharp decrease in a discharging capacity, which can remain at only approximately 30 percent (%) of a specific capacity at a normal temperature. Therefore, heating the battery pack is an important part for using the electric vehicle in the low-temperature environment.

In the conventional technology, a battery pack is usually heated by using an additional heating apparatus including a semiconductor material, a component, or the like with a large positive temperature coefficient (PTC). At a low temperature, a PTC heats coolant of a battery cooling loop to preheat a battery. However, the additional PTC increases system costs.

SUMMARY

Embodiments of this application disclose a method, an apparatus, and a system for processing an asynchronous motor, and a transportation means, so that a battery pack is heated without an additional heating apparatus. This resolves a problem that an additional PTC increases system costs, and improves a rate at which an asynchronous motor heats coolant. In addition, regardless of whether the asynchronous motor is stationary or running, the coolant can be heated to preheat the asynchronous motor.

According to a first aspect, an embodiment of this application provides a method for processing an asynchronous motor, including obtaining indication trigger information, and in response to the indication trigger information, injecting a first current into a stator winding of the asynchronous motor, where the first current is for generating heat but does not generate a torque for the asynchronous motor, and the heat heats a battery pack through a heat exchanger.

In this embodiment of this application, the current that does not generate the torque for the asynchronous motor is injected into the stator winding, to generate the heat to heat the battery pack. This resolves a problem that an additional PTC increases system costs, and improves a rate at which the asynchronous motor heats coolant. In addition, regardless of whether the asynchronous motor is stationary or running, the coolant can be heated to preheat the asynchronous motor.

In a possible implementation, the indication trigger information includes information indicating that a temperature of the battery pack is less than or equal to a threshold.

In this embodiment of this application, when the temperature of the battery pack is less than or equal to the threshold, injection of the first current into the stator winding of the asynchronous motor may be triggered, and when the temperature of the battery pack is greater than the threshold, injection of the first current may be stopped. In this way, control on heating of the temperature of the battery pack is more properly implemented, and a waste of resources is avoided.

In a possible implementation, the first current is a direct current or a harmonic current that generates pulsating magnetomotive force.

When the first current is the harmonic current that generates the pulsating magnetomotive force, the first current may further additionally generate heat for iron in the motor. Therefore, in this embodiment of this application, not only a copper loss of the motor but also an iron loss of the motor is used to maximize heat generation of the motor. As a result, the rate at which the asynchronous motor heats the coolant is further improved.

In a possible implementation, the asynchronous motor is a three-phase asynchronous motor and includes three coils U1-U2, V1-V2, and W1-W2, and the direct current includes $I_U$, $I_V$, and $I_W$, which satisfy respectively:

$I_U = I$ $I_V = -aI$; and $I_W = -bI$, where a plus b is equal to 1.

In this embodiment of this application, an absolute value of an amplitude of a current in one coil is set to be equal to a sum of absolute values of amplitudes of currents in the other two coils, and a direction of the current in the coil is opposite to directions of the currents in the other two coils. As a result, the direct current that is input to the three-phase asynchronous motor is for generating the heat, but does not generate the torque for the three-phase asynchronous motor. The direct current may be input when the asynchronous motor is in a stationary state, or may be input when the asynchronous motor is in a running state. This resolves the problem that the additional PTC increases the system costs, and improves the rate at which the asynchronous motor heats the coolant. In addition, regardless of whether the asynchronous motor is stationary or running, the coolant can be heated to preheat the asynchronous motor.

In a possible implementation, the asynchronous motor is a three-phase asynchronous motor and includes three coils U1-U2, V1-V2, and W1-W2, and if the asynchronous motor is in a stationary state, the first current includes $I_U$, $I_V$, and $I_W$, an amplitude of a current in one of the three coils is twice an amplitude of a current in each of the other two coils, and a direction of the current in the coil is opposite to directions of the currents in the other two coils.

In this embodiment of this application, for $I_U$, $I_V$, and $I_W$ that are input to the three-phase asynchronous motor, the amplitude of the current in the coil is set to be twice the amplitude of the current in each of the other two coils, and the direction of the current in the coil is opposite to the directions of the currents in the other two coils. In this way, no torque is generated for the three-phase asynchronous motor. In addition, regardless of whether the asynchronous motor is stationary or running, the coolant can be heated to preheat the asynchronous motor. This resolves the problem that the additional PTC increases the system costs, and improves the rate at which the asynchronous motor heats the coolant.

In a possible implementation, the asynchronous motor is a three-phase asynchronous motor and includes three coils U1-U2, V1-V2, and W1-W2, if the asynchronous motor is in a running state, a second current is further injected into the stator winding of the asynchronous motor, and the second current is a three-phase current for driving the asynchronous motor to run, and the first current and the second current are superimposed and injected into the stator winding of the asynchronous motor, and the first current includes $I_U$, $I_V$, and $I_W$, an amplitude of a current in one of the three coils is twice an amplitude of a current in each of the other two coils, and a direction of the current in the coil is opposite to directions of the currents in the other two coils.

In this embodiment of this application, for the three-phase asynchronous motor, if the three-phase asynchronous motor is in a running state, the second current for driving the asynchronous motor to run is further injected. That is, the first current and the second current are superimposed and injected into the stator winding of the asynchronous motor. The first current also does not generate a torque for the three-phase asynchronous motor, and the coolant may be heated by using generated heat, to preheat the asynchronous motor. This resolves the problem that the additional PTC increases the system costs, and improves the rate at which the asynchronous motor heats the coolant.

In a possible implementation, $I_U$, $I_V$, and $I_W$ satisfy respectively:

$$I_U = I\cos(\omega t + \theta_1);$$

$$I_V = -\frac{1}{2}I\cos(\omega t + \theta_1); \text{ and}$$

$$I_W = -\frac{1}{2}I\cos(\omega t + \theta_1).$$

In this embodiment of this application, $I_U$, $I_V$, and $I_W$ are set. ($\omega t+\theta$) is the phase, with $\omega$ being the angular frequency (radians per second) such as $2\pi/T$, and $\theta$ being the phase constant. In this way, currents can be quickly and efficiently injected into the stator winding of the asynchronous motor, where the currents are used to generate heat and do not generate a torque for the asynchronous motor. This resolves the problem that the additional PTC increases the system costs, and improves the rate at which the asynchronous motor heats the coolant. In addition, regardless of whether the asynchronous motor is stationary or running, the coolant can be heated to preheat the asynchronous motor. Besides, $I_U$, $I_V$, and $I_W$ can further additionally generate heat for iron in the motor. That is, not only a copper loss of the motor but also an iron loss of the motor is used to maximize heat generation of the motor. As a result, the rate at which the asynchronous motor heats the coolant is further improved.

In a possible implementation, the first current and the second current are superimposed as follows:

$$I_U' = I_m\cos(\omega_m t + \theta_2) + I\cos(\omega t + \theta_1);$$

$$I_V' = I_m\cos(\omega_m t + \theta_2 - 120°) - \frac{1}{2}I\cos(\omega t + \theta_1); \text{ and}$$

$$I_W' = I_m\cos(\omega_m t + \theta_2 + 120°) - \frac{1}{2}I\cos(\omega t + \theta_1).$$

The first current injected into the stator winding does not generate a constant torque, but generates an additional copper loss and iron loss. Therefore, the coolant can still be heated to heat the battery pack, when the asynchronous motor is running. As a result, a heat generation power of the motor is high, and a speed at which an electric drive heats the coolant is high. This resolves the problem that the additional PTC increases the system costs.

In a possible implementation, the amplitudes and the directions of the three phase currents, in the three coils, in the first current are sequentially rotated at a preset time interval.

In this embodiment of this application, the first current is injected in a rotation manner, so that heat generation of three phases can be more balanced. In an example, an evenness degree of heat generation of the winding of the asynchronous motor is increased, and a service life of the winding is prolonged.

In a possible implementation, the asynchronous motor includes an asynchronous drive motor and/or an asynchronous oil pump motor.

In this embodiment of this application, the first current may be further injected into the asynchronous oil pump motor, when the asynchronous oil pump motor is running, so that the coolant is heated by using both the asynchronous drive motor and the asynchronous oil pump motor in an electric vehicle drive system. As a result, the rate at which the coolant is heated is further improved, and the battery pack is quickly heated.

According to a second aspect, an embodiment of this application discloses an apparatus for processing an asynchronous motor, including an information obtaining unit configured to obtain indication trigger information, and an injection control unit configured to, in response to the indication trigger information, inject a first current into a stator winding of the asynchronous motor, where the first current is for generating heat but does not generate a torque for the asynchronous motor, and the heat heats a battery pack through a heat exchanger.

In a possible implementation, the indication trigger information includes information indicating that a temperature of the battery pack is less than or equal to a threshold.

In a possible implementation, the first current is a direct current or a harmonic current that generates pulsating magnetomotive force.

In a possible implementation, the asynchronous motor is a three-phase asynchronous motor and includes three coils U1-U2, V1-V2, and W1-W2, and the direct current includes $I_U$, $I_V$, and $I_W$, which satisfy respectively:
   $I_U$=I
   $I_V$=-aI; and
   $I_W$=-bI, where
   a plus b is equal to 1.

In a possible implementation, the asynchronous motor is a three-phase asynchronous motor and includes three coils U1-U2, V1-V2, and W1-W2, and if the asynchronous motor is in a stationary state, the first current includes $I_U$, $I_V$, and $I_W$, an amplitude of a current in one of the three coils is twice an amplitude of a current in each of the other two coils, and a direction of the current in the coil is opposite to directions of the currents in the other two coils.

In a possible implementation, the asynchronous motor is a three-phase asynchronous motor and includes three coils U1-U2, V1-V2, and W1-W2, if the asynchronous motor is in a running state, a second current is further injected into the stator winding of the asynchronous motor, and the second current is a three-phase current for driving the asynchronous motor to run, and the first current and the second current are superimposed and injected into the stator winding of the asynchronous motor, and the first current includes $I_U$, $I_V$, and $I_W$, an amplitude of a current in one of the three coils is twice an amplitude of a current in each of the other two coils, and a direction of the current in the coil is opposite to directions of the currents in the other two coils.

In a possible implementation, $I_U$, $I_V$, and $I_W$ satisfy respectively:

$$I_U = I\cos(\omega t + \theta_1);$$
$$I_V = -\frac{1}{2}I\cos(\omega t + \theta_1); \text{ and}$$
$$I_W = -\frac{1}{2}I\cos(\omega t + \theta_1).$$

In a possible implementation, the first current and the second current are superimposed as follows:

$$I'_U = I_m\cos(\omega_m t + \theta_2) + I\cos(\omega t + \theta_1);$$
$$I'_V = I_m\cos(\omega_m t + \theta_2 - 120°) - \frac{1}{2}I\cos(\omega t + \theta_1); \text{ and}$$
$$I'_W = I_m\cos(\omega_m t + \theta_2 + 120°) - \frac{1}{2}I\cos(\omega t + \theta_1).$$

In a possible implementation, the amplitudes and the directions of the three phase currents, in the three coils, in the first current are sequentially rotated at a preset time interval.

In a possible implementation, the asynchronous motor includes an asynchronous drive motor and/or an asynchronous oil pump motor.

According to a third aspect, an embodiment of this application discloses a device for processing an asynchronous motor, including a processor and an interface circuit.

The interface circuit is configured to receive code instructions and transmit the code instructions to the processor.

The processor is configured to run the code instructions to perform the method for processing the asynchronous motor according to any one of the implementations of the first aspect.

According to a fourth aspect, an embodiment of this application discloses a system for processing an asynchronous motor, including the asynchronous motor, a motor controller, a heat exchanger, and a battery pack.

The motor controller is configured to, after obtaining indication trigger information, in response to the indication trigger information, control a power module to inject a first current into a stator winding of the asynchronous motor, where the first current is for generating heat but does not generate a torque for the asynchronous motor.

The heat exchanger is configured to heat the battery pack by using the heat generated by the first current.

In a possible implementation, the indication trigger information includes information indicating that a temperature of the battery pack is less than or equal to a threshold.

In a possible implementation, the first current is a direct current or a harmonic current that generates pulsating magnetomotive force.

In a possible implementation, the asynchronous motor is a three-phase asynchronous motor and includes three coils U1-U2, V1-V2, and W1-W2, and the direct current includes $I_U$, $I_V$, and $I_W$, which satisfy respectively:
$I_U = I$
$I_V = -aI$; and
$I_W = -bI$, where
a plus b is equal to 1.

In a possible implementation, the asynchronous motor is a three-phase asynchronous motor and includes three coils U1-U2, V1-V2, and W1-W2, and if the asynchronous motor is in a stationary state, the first current includes $I_U$, $I_V$, and $I_W$, an amplitude of a current in one of the three coils is twice an amplitude of a current in each of the other two coils, and a direction of the current in the coil is opposite to directions of the currents in the other two coils.

In a possible implementation, the asynchronous motor is a three-phase asynchronous motor and includes three coils U1-U2, V1-V2, and W1-W2, if the asynchronous motor is in a running state, a second current is further injected into the stator winding of the asynchronous motor, and the second current is a three-phase current for driving the asynchronous motor to run, and the first current and the second current are superimposed and injected into the stator winding of the asynchronous motor.

The first current includes $I_U$, $I_V$, and $I_W$, an amplitude of a current in one of the three coils is twice an amplitude of a current in each of the other two coils, and a direction of the current in the coil is opposite to directions of the currents in the other two coils.

In a possible implementation, $I_U$, $I_V$, and $I_W$ satisfy respectively:

$$I_U = I\cos(\omega t + \theta_1);$$
$$I_V = -\frac{1}{2}I\cos(\omega t + \theta_1); \text{ and}$$
$$I_W = -\frac{1}{2}I\cos(\omega t + \theta_1).$$

In a possible implementation, the first current and the second current are superimposed as follows:

$$I'_U = I_m\cos(\omega_m t + \theta_2) + I\cos(\omega t + \theta_1);$$
$$I'_V = I_m\cos(\omega_m t + \theta_2 - 120°) - \frac{1}{2}I\cos(\omega t + \theta_1); \text{ and}$$
$$I'_W = I_m\cos(\omega_m t + \theta_2 + 120°) - \frac{1}{2}I\cos(\omega t + \theta_1).$$

In a possible implementation, the amplitudes and the directions of the three phase currents, in the three coils, in the first current are sequentially rotated at a preset time interval.

In a possible implementation, the asynchronous motor includes an asynchronous drive motor and/or an asynchronous oil pump motor.

According to a fifth aspect, an embodiment of this application discloses a transportation means, including the system for processing the asynchronous motor according to any one of the implementations of the third aspect.

According to a sixth aspect, an embodiment of this application discloses a computer-readable storage medium, including computer instructions. When the computer instructions are run on an electronic device, the electronic device is enabled to perform the method for processing the asynchronous motor according to any one of the implementations of the first aspect.

According to a seventh aspect, an embodiment of this application discloses a computer program product. When the computer program product is run on an electronic device, the electronic device is enabled to perform the method for processing the asynchronous motor according to any one of the implementations of the first aspect.

According to an eighth aspect, an embodiment of this application discloses a chip. The chip includes at least one processor, a memory, and an interface circuit. The memory, the interface circuit, and the at least one processor are connected to each other through a line, and the at least one memory stores instructions. When the instructions are executed by the processor, the method for processing the asynchronous motor according to any one of the implementations of the first aspect is implemented.

It may be understood that, for beneficial effects of the second aspect to the eighth aspect, refer to the beneficial effects of the method for processing the asynchronous motor according to the first aspect. Details are not described herein again.

DESCRIPTION OF EMBODIMENTS

The following describes embodiments of this application with reference to the accompanying drawings in embodiments of this application.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular feature, structure, or characteristic described with reference to this embodiment may be included in at least one embodiment of this application. The phrase shown in various locations in this specification may not necessarily refer to a same embodiment, and is not an independent or optional embodiment exclusive from another embodiment. It is explicitly and implicitly understood by persons skilled in the art that embodiments described in this specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer.

Figure 1:
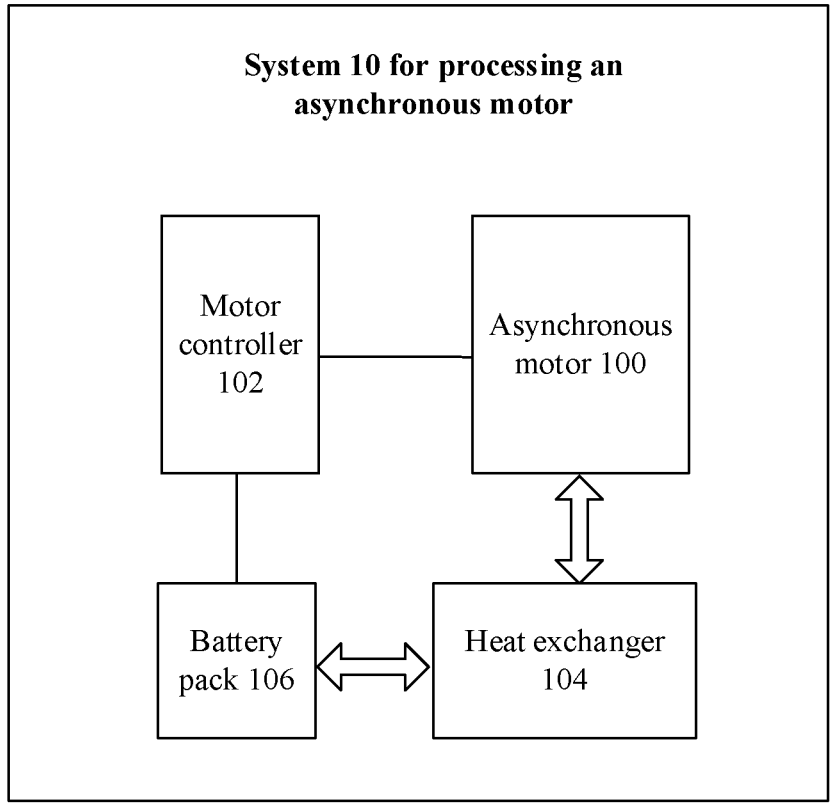
FIG. 1 is a schematic diagram of a structure of a system for processing an asynchronous motor according to an embodiment of this application.

FIG. 1 is a schematic diagram of a structure of a system for processing an asynchronous motor according to an embodiment of this application. A system 10 for processing an asynchronous motor may include the asynchronous motor 100, a motor controller 102, a heat exchanger 104, and a battery pack 106. The motor controller 102 may be a microcontroller unit (MCU), for example as a single-chip microcomputer or a microcontroller. The motor controller 102 is configured to control and manage the asynchronous motor 100 and the battery pack 106. Arrows in FIG. 1 represent heat transfer processes. Heat generated by the asynchronous motor 100 may be transferred to the heat exchanger 104, and then the heat exchanger 104 may heat the battery pack 106 by using the heat, so as to properly use waste heat of the asynchronous motor 100.

In order to resolve a problem that an additional PTC increases system costs, in a case, a neutral line is led out from a winding of a three-phase alternating current asynchronous motor, and the winding forms different loops with a battery, a voltage conversion module, and an inverter. Coolant that flows through the motor, an energy storage module, and the inverter is heated to heat the battery. Although an additional heating apparatus is omitted, in this technical solution, a neutral point of three phases needs to be led out, and connected to an additional energy storage inductor by using a switch. This reduces reliability of a system, and the additional switch and inductor also increase costs and a volume. In addition, because there is no high-frequency magnetic field in this technical solution, only a copper loss of the motor can be used for heat generation, and an iron loss of the motor cannot be used for heat generation. Therefore, heat generation of the motor cannot be maximized. Besides, in this technical solution, the switch needs to be in different states when the battery is heated and when the motor is normally running. Therefore, heating is not supported when a transportation means (for example, a vehicle) starts running. In an example, the battery can be preheated only when the motor is stationary.

In another case, a motor is used as a continuous buffer apparatus, and a manner to turn on or turn off a switching transistor of a motor control system is controlled to control a loop current, so that an internal resistance of a power battery generates heat to heat a battery pack. However, in the technical solution in which heat is generated mainly by using the internal resistance of the battery, heat generated by the motor cannot be fully used. A heat generation power is low, a heating speed is low, and a heating apparatus cannot be completely replaced.

With reference to FIG. 2 to FIG. 6, the following describes a method for processing the asynchronous motor provided in an embodiment of this application. This method resolves a problem that an additional PTC increases system costs, and improves a rate at which an asynchronous motor heats coolant. In addition, regardless of whether the asynchronous motor is stationary or running, the coolant can be heated to preheat the asynchronous motor.

Figure 2:
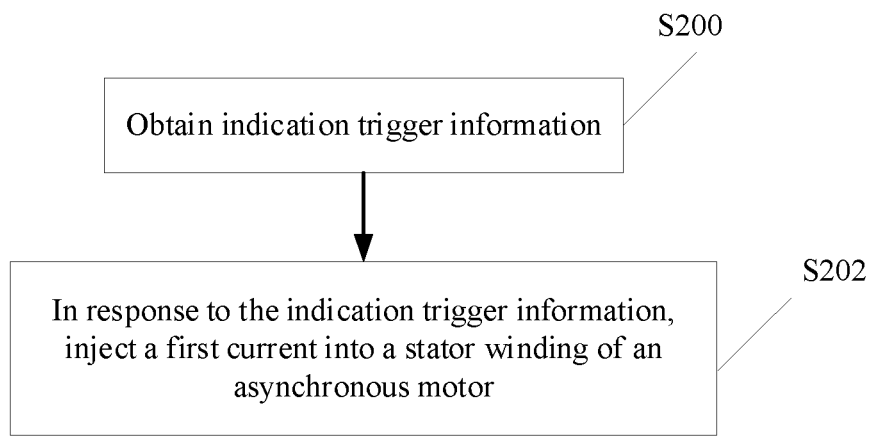
FIG. 2 is a schematic flowchart of a method for processing the asynchronous motor according to an embodiment of this application.

FIG. 2 is a schematic flowchart of a method for processing an asynchronous motor according to an embodiment of this application. The method may include the following steps.

Step S200: Obtain indication trigger information.

Further, the indication trigger information in this embodiment of this application is used to indicate the motor controller 102 to trigger execution of step S202. In an example, after obtaining the indication trigger information, the motor controller 102 performs step S202.

In a possible implementation, the indication trigger information in this embodiment of this application may include information indicating that a temperature of the battery pack 106 is less than or equal to a threshold. Further, a temperature collection component, for example, a temperature sensor, may be used to collect the temperature of the battery pack 106, and then detect whether the collected temperature is less than or equal to the threshold.

If a detection result is that the temperature of the battery pack is less than or equal to the threshold, the detection result itself may be equivalent to the indication trigger information, or the indication trigger information used to indicate the motor controller 102 to trigger execution of step S202 may be generated after the detection result is obtained.

The operation of detecting the temperature of the battery pack 106 may be performed by the motor controller 102, or may be performed by another calculation module.

After obtaining the indication trigger information, the motor controller 102 performs step S202.

Step S202: In response to the indication trigger information, inject a first current into a stator winding of the asynchronous motor, where the first current is for generating heat but does not generate a torque for the asynchronous motor, and the heat heats a battery pack through a heat exchanger.

Further, the motor controller 102 may control a power module to output a required current, and the power module may be connected to the asynchronous motor. Then, in response to the indication trigger information, the motor controller 102 controls the power module to inject the first current into the stator winding of the asynchronous motor, where the first current is for generating the heat but does not generate the torque for the asynchronous motor.

The operation of detecting whether the collected temperature is less than or equal to the threshold may be performed at a specific time interval. If it is detected that the temperature is greater than the threshold, the first current is not injected into the stator winding of the asynchronous motor.

In an example, in this embodiment of this application, when the temperature of the battery pack is less than or equal to the threshold, injection of the first current into the stator winding of the asynchronous motor may be triggered, and when the temperature of the battery pack is greater than the threshold, injection of the first current may be stopped. In this way, control on heating of the temperature of the battery pack is more properly implemented, and a waste of resources is avoided.

Figure 3:
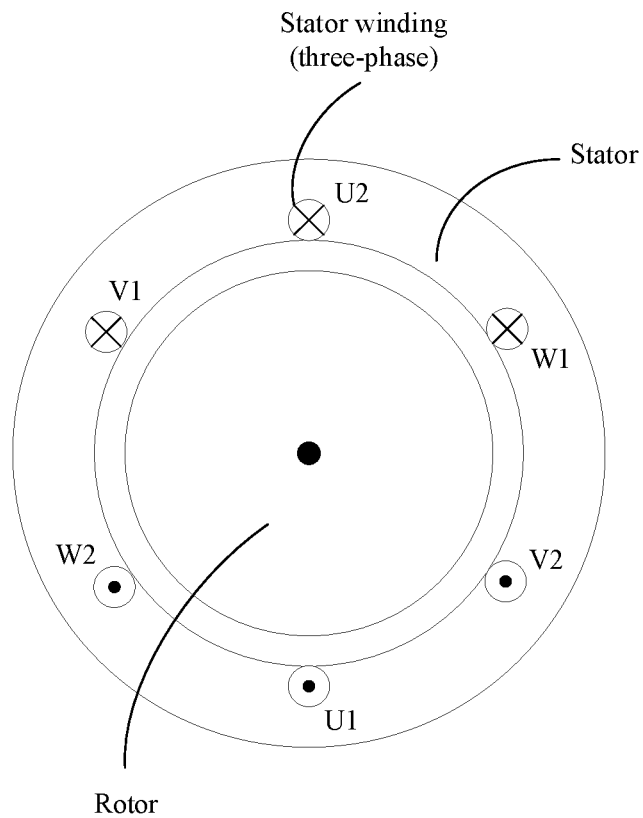
FIG. 3 is a schematic diagram of a structure of a three-phase asynchronous motor according to an embodiment of this application.

In a possible implementation, the first current in this embodiment of this application may be a direct current. An example in which the asynchronous motor is a three-phase asynchronous motor is used. FIG. 3 is a schematic diagram of a structure of a three-phase asynchronous motor according to an embodiment of this application. The three-phase asynchronous motor may include three coils U1-U2, V1-V2, and W1-W2. Input direct currents are respectively input to the three coils, and may include $I_U$, $I_V$, and $I_W$, which satisfy respectively:

$I_U = I$ $I_V = -aI$; and $I_W = -bI$, where a plus b is equal to 1.

Figure 4:
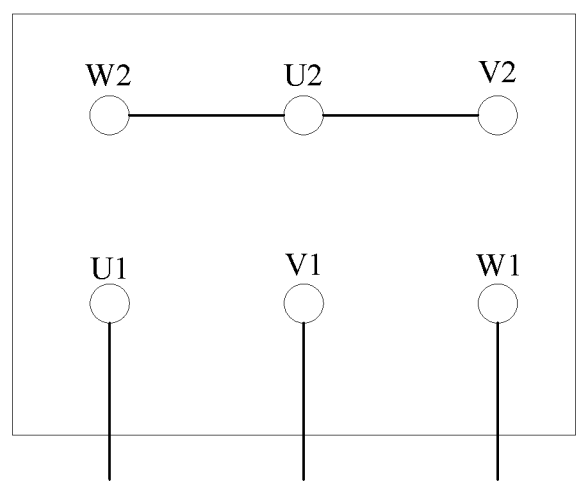
FIG. 4 is a schematic connection diagram of a three-phase stator winding according to an embodiment of this application.
Figure 5:
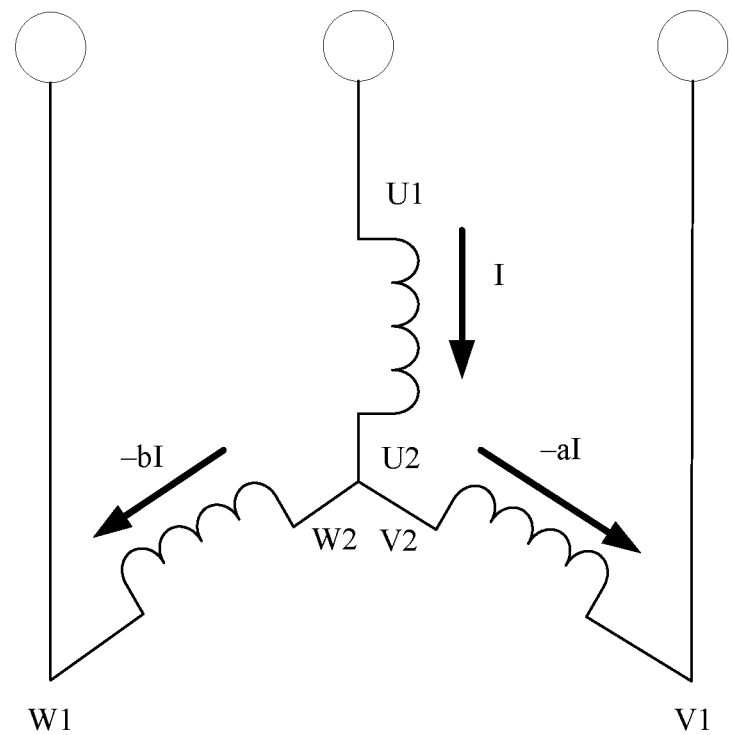
FIG. 5 is a schematic circuit diagram of a connection of a three-phase stator winding according to an embodiment of this application.
Figure 6:
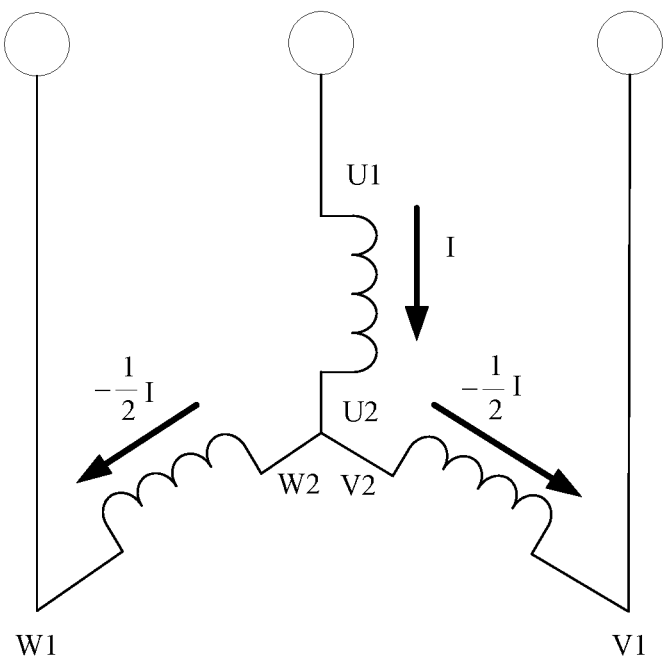
FIG. 6 is a schematic circuit diagram of a connection of a three-phase stator winding according to another embodiment of this application.

For example, FIG. 4 is a schematic connection diagram of a three-phase stator winding according to an embodiment of this application. FIG. 4 shows a connection for a junction box. A connection for the three-phase stator winding is a star connection (a Y connection). Correspondingly, FIG. 5 is a schematic circuit diagram of a connection of a three-phase stator winding according to an embodiment of this application. Directions of direct currents $I_U$, $I_V$, and $I_W$ are shown by arrows in FIG. 5.

An absolute value of an amplitude of a current in one coil is set to be equal to a sum of absolute values of amplitudes of currents in the other two coils, and a direction of the current in the coil is opposite to directions of the currents in the other two coils. For example, the amplitude of the current in the coil is twice the amplitude of the current in each of the other two coils, that is, a=b=0.5. In this way, no torque is generated for the three-phase asynchronous motor. In addition, regardless of whether the asynchronous motor is stationary or running, coolant can be heated to preheat the asynchronous motor. This resolves a problem that an additional PTC increases system costs, and improves a rate at which the asynchronous motor heats the coolant.

In a possible implementation, the first current in this embodiment of this application may be a harmonic current that generates pulsating magnetomotive force. An absolute value of an amplitude of a current in one coil may be set to be constantly equal to a sum of absolute values of amplitudes of currents in the other two coils, and a direction of the current in the coil is opposite to directions of the currents the other two coils. In this way, no torque is generated for the three-phase asynchronous motor. In addition, regardless of whether the asynchronous motor is stationary or running, coolant can be heated to preheat the asynchronous motor. For example, the amplitude of the current in one of the three coils is twice the amplitude of the current in each of the other two coils, and the direction of the current in the coil is opposite to the directions of the currents in the other two coils.

The example in which the asynchronous motor in FIG. 3 is a three-phase asynchronous motor is still used. Harmonic currents that are respectively input to the three coils may include $I_U$, $I_V$, and $I_W$.

For example, $I_U$, $I_V$, and $I_W$ may satisfy respectively:

$$I_U = I\cos(\omega t + \theta_1);$$

$$I_V = -\frac{1}{2}I\cos(\omega t + \theta_1); \text{ and}$$

$$I_W = -\frac{1}{2}I\cos(\omega t + \theta_1).$$

For another example, $I_U$, $I_V$, and $I_W$ may satisfy respectively:

$$I_U = I\sin(\omega t + \theta_1);$$

$$I_V = -\frac{1}{2}I\sin(\omega t + \theta_1); \text{ and}$$

$$I_W = -\frac{1}{2}I\sin(\omega t + \theta_1).$$

For example, similarly, a connection of a three-phase stator winding provided in this embodiment of this application may be shown in FIG. 4. A circuit of a connection of a three-phase stator winding provided in another embodiment of this application may be shown in FIG. 6. When a harmonic current $I_U$ is positive and harmonic currents $I_V$ and $I_W$ are negative, directions of the currents are shown by arrows in FIG. 6.

In this embodiment of this application, $I_U$, $I_V$, and $I_W$ are set. In this way, currents can be quickly and efficiently injected into the stator winding of the asynchronous motor, where the currents are used to generate heat and do not generate a torque for the asynchronous motor. In addition, the injected harmonic currents $I_U$, $I_V$, and $I_W$ can further additionally generate heat for iron in the motor. That is, not only a copper loss of the motor but also an iron loss of the motor is used to maximize heat generation of the motor. As a result, a rate at which the asynchronous motor heats coolant is further improved.

If the asynchronous motor in this embodiment of this application is in a running state, a second current is further injected into the stator winding of the asynchronous motor. The second current is a three-phase current for driving the asynchronous motor to run. The first current and the second current are superimposed and injected into the stator winding of the asynchronous motor. The first current also does not generate a torque for the three-phase asynchronous motor, and coolant may be heated by using generated heat, to preheat the asynchronous motor.

In a possible implementation, the first current and the second current are superimposed as follows:

$$I'_U = I_m\cos(\omega_m t + \theta_2) + I\cos(\omega t + \theta_1);$$

$$I'_V = I_m\cos(\omega_m t + \theta_2 - 120°) - \frac{1}{2}I\cos(\omega t + \theta_1); \text{ and}$$

$$I'_W = I_m\cos(\omega_m t + \theta_2 + 120°) - \frac{1}{2}I\cos(\omega t + \theta_1).$$

Alternatively, the first current and the second current are superimposed as follows:

$$I'_U = I_m\cos(\omega_m t + \theta_2) + I\sin(\omega t + \theta_1);$$

$$I'_V = I_m\cos(\omega_m t + \theta_2 - 120°) - \frac{1}{2}I\sin(\omega t + \theta_1); \text{ and}$$

$$I'_W = I_m\cos(\omega_m t + \theta_2 + 120°) - \frac{1}{2}I\sin(\omega t + \theta_1).$$

Alternatively, the first current and the second current are superimposed as follows:

$$I'_U = I_m\sin(\omega_m t + \theta_2) + I\cos(\omega t + \theta_1);$$

$$I'_V = I_m\sin(\omega_m t + \theta_2 - 120°) - \frac{1}{2}I\cos(\omega t + \theta_1); \text{ and}$$

$$I'_W = I_m\sin(\omega_m t + \theta_2 + 120°) - \frac{1}{2}I\cos(\omega t + \theta_1).$$

Alternatively, the first current and the second current are superimposed as follows:

$$I'_U = I_m\sin(\omega_m t + \theta_2) + I\sin(\omega t + \theta_1);$$

$$I'_V = I_m\sin(\omega_m t + \theta_2 - 120°) - \frac{1}{2}I\sin(\omega t + \theta_1); \text{ and}$$

$$I'_W = I_m\sin(\omega_m t + \theta_2 + 120°) - \frac{1}{2}I\sin(\omega t + \theta_1).$$

As long as the first current injected into the stator winding does not generate a constant torque, but generates an additional copper loss and iron loss, the coolant can still be heated to heat the battery pack, when the asynchronous motor is running. As a result, a heat generation power of the motor is high, and a speed at which an electric drive heats the coolant is high. This resolves a problem that an additional PTC increases system costs.

In a possible implementation, the amplitudes and the directions of the three phase currents, in the three coils, in the first current in this embodiment of this application are sequentially rotated at a preset time interval.

For example, the time interval is t. Within a time range from 0 to t, the first current is:

$$I_U = I\cos(\omega t + \theta_1);$$

$$I_V = -\frac{1}{2}I\cos(\omega t + \theta_1); \text{ and}$$

$$I_W = -\frac{1}{2}I\cos(\omega t + \theta_1).$$

Within a time range from t to 2t, the first current is changed to:

$$I_U = -\frac{1}{2}I\cos(\omega t + \theta_1);$$

$$I_V = I\cos(\omega t + \theta_1); \text{ and}$$

$$I_W = -\frac{1}{2}I\cos(\omega t + \theta_1).$$

Then, within a time range from 2t to 3t, the first current is changed to:

$$I_U = -\frac{1}{2}I\cos(\omega t + \theta_1);$$

$$I_V = -\frac{1}{2}I\cos(\omega t + \theta_1); \text{ and}$$

$$I_W = I\cos(\omega t + \theta_1).$$

Next, within a time range from 3t to 4t, the first current is changed to:

$$I_U = I\cos(\omega t + \theta_1);$$

$$I_V = -\frac{1}{2}I\cos(\omega t + \theta_1); \text{ and}$$

$$I_W = -\frac{1}{2}I\cos(\omega t + \theta_1).$$

In this way, sequential periodic rotation is performed at the preset time interval t, so that heat generation of the three phases can be more balanced. In an example, an evenness degree of heat generation of the winding of the asynchronous motor is increased, and a service life of the winding is prolonged. The time interval t may be set based on an actual situation of a product. For example, the time interval t may be set to 60 seconds.

In a possible implementation, the asynchronous motor in this embodiment of this application may include an asynchronous drive motor and/or an asynchronous oil pump motor. In an example, the method for processing the asynchronous motor in embodiments of this application may be specific to only an asynchronous drive motor, may be specific to only an asynchronous oil pump motor, or may be specific to both an asynchronous drive motor and an asynchronous oil pump motor.

A new energy electric vehicle is used as an example. If the new energy electric vehicle includes an asynchronous drive motor and an asynchronous oil pump motor, the method for processing the asynchronous motor in embodiments of this application may be performed for the asynchronous drive motor, to heat a battery pack. When the asynchronous oil pump motor is in a running state, the method for processing the asynchronous motor in embodiments of this application may also be performed for the asynchronous drive motor. As a result, a rate at which coolant is heated is further improved, and the battery pack is quickly heated.

The foregoing describes in detail the method in embodiments of this application. The following provides apparatuses in embodiments of this application.

Figure 7:
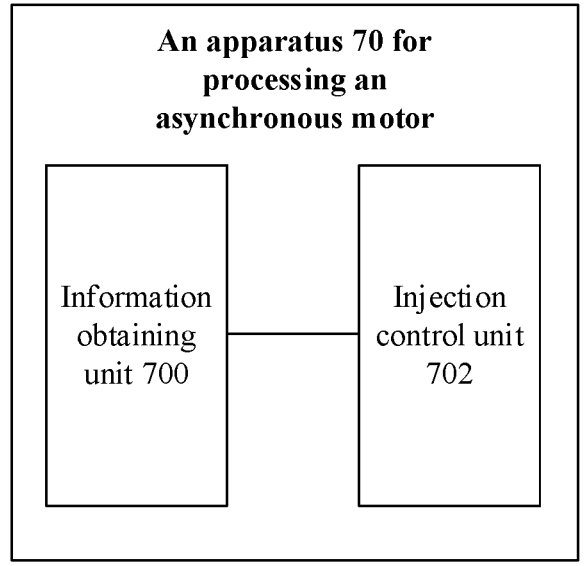
FIG. 7 is a schematic diagram of a structure of an apparatus for processing an asynchronous motor according to an embodiment of this application.

FIG. 7 is a schematic diagram of a structure of an apparatus for processing an asynchronous motor according to an embodiment of this application. An apparatus 70 for processing an asynchronous motor may include an information obtaining unit 700 and an injection control unit 702.

The information obtaining unit 700 is configured to obtain indication trigger information.

The injection control unit 702 is configured to, in response to the indication trigger information, inject a first current into a stator winding of the asynchronous motor. The first current is for generating heat but does not generate a torque for the asynchronous motor, and the heat heats a battery pack through a heat exchanger.

It should be noted that, for implementations of the information obtaining unit 700 and the injection control unit 702, refer to corresponding descriptions of the steps performed by the motor controller 102 in the method embodiments shown in FIG. 2 to FIG. 6. Details are not described herein again.

Figure 8:
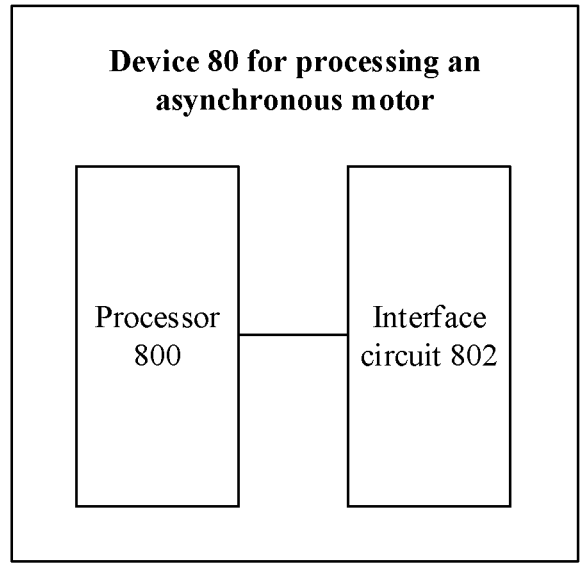
FIG. 8 is a schematic diagram of a structure of a device for processing an asynchronous motor according to an embodiment of this application.

FIG. 8 is a schematic diagram of a structure of a device for processing an asynchronous motor according to an embodiment of this application. A device 80 for processing an asynchronous motor may include a processor 800 and an interface circuit 802.

The processor 800 may be an integrated circuit chip with a signal processing capability. During implementation, the steps of the foregoing method may be completed by using a hardware integrated logic circuit in the processor 800 or by using instructions in a form of software. The processor 800 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 800 may implement or perform the method and steps that are disclosed in embodiments of this application. The general-purpose processor may be a microprocessor, or the processor may be any conventional processor or the like.

The interface circuit 802 may send or receive data, instructions, or information. The processor 800 may process data, instructions, or other information received by the interface circuit 802, and send, through the interface circuit 802, information obtained through processing.

The interface circuit 802 is further configured to receive code instructions and transmit the code instructions to the processor 800.

The processor 800 is further configured to run the code instructions to perform the steps in the method for processing the asynchronous motor provided in FIG. 2 to FIG. 6. For details, refer to the implementations of the foregoing method embodiments. Details are not described herein again.

Figure 9:
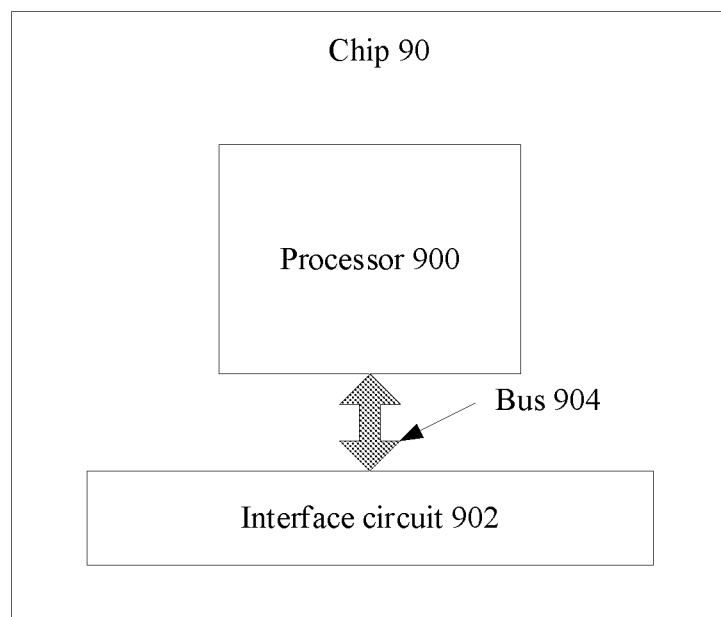
FIG. 9 is a schematic diagram of a structure of a chip according to an embodiment of this application.

Refer to FIG. 9. An embodiment of this application further provides a chip 90, including one or more processors 900 and an interface circuit 902. Optionally, the chip 90 may further include a bus 904.

The processor 900 may be an integrated circuit chip with a signal processing capability. During implementation, the steps of the foregoing method may be completed by using a hardware integrated logic circuit in the processor 900 or by using instructions in a form of software. The processor 900 may be a general-purpose processor, a DSP, an ASIC, an FPGA or another programmable logic device, a discrete gate or transistor logic device, or a discrete hardware component. The processor 900 may implement or perform the method for processing the asynchronous motor disclosed in embodiments of this application. The general-purpose processor may be a microprocessor, or the processor may be any conventional processor or the like.

The interface circuit 902 may send or receive data, instructions, or information. The processor 900 may process data, instructions, or other information received by the interface circuit 902, and send, through the interface circuit 902, information obtained through processing.

Optionally, the chip 90 may further include a memory. The memory may include a read-only memory (ROM) and a random-access memory (RAM), and provide operation instructions and data to the processor. A part of the memory may further include a non-volatile RAM (NVRAM).

Optionally, the chip 90 may be used in the new energy electric vehicle, for example, in an in-vehicle system, in embodiments of this application.

It should be noted that a function corresponding to each of the processor 900 and the interface circuit 902 may be implemented by using a hardware design, may be implemented by using a software design, or may be implemented by a combination of software and hardware. This is not limited herein.

Figure 10:
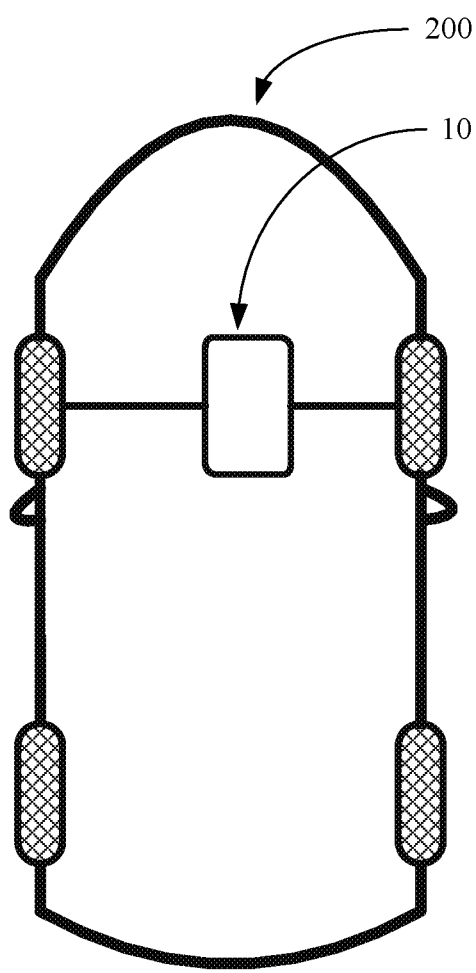
FIG. 10 is a schematic diagram of a structure of a transportation means according to an embodiment of this application.

Refer to FIG. 10. An embodiment of this application further provides a transportation means 200. The transportation means 200 includes the system 10 for processing the asynchronous motor in embodiments of this application. The transportation means 200 in FIG. 10 is shown by using a vehicle as an example. However, in this embodiment of this application, the transportation means 200 is not limited to a vehicle, and may be a ship, a subway, an airplane, a rocket, or the like.

For an implementation of the system 10 for processing the asynchronous motor in the transportation means 200, refer to the implementations of the foregoing method embodiments. Details are not described herein again.

An embodiment of this application further provides a computer-readable storage medium. All or some of the procedures in the foregoing method embodiments may be completed by a computer program instructing related hardware. The program may be stored in the foregoing computer storage medium. When the program is executed, the procedures of the foregoing method embodiments may be included. The computer-readable storage medium includes any medium that may store program code, such as a ROM or a RAM. A computer program or computer instructions in the computer-readable storage medium may be invoked and executed by the motor controller 102 (for example, a single-chip microcomputer) and the chip 90.

Sequence adjustment, combination, and deletion of the steps of the method in embodiments of this application may be performed based on an actual requirement.

The modules in the apparatuses in embodiments of this application may be combined, divided, and deleted based on an actual requirement.

In conclusion, the foregoing embodiments are intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

The invention claimed is:

1. A method for processing an asynchronous motor comprising:
   obtaining indication trigger information;
   injecting, in response to the indication trigger information, a first current into a stator winding of the asynchronous motor;
   generating, using the first current, heat without generating torque in the asynchronous motor;
   heating a battery pack with the heat through a heat exchanger; and
   injecting a second current into coils of the stator winding comprising a U1-U2 coil, a V1-V2 coil, and a W1-W2 coil after superimposing with the first current when the asynchronous motor is in a running state, wherein the second current is a three-phase current for driving the asynchronous motor to run, wherein the first current comprises $I_U$, $I_V$, and $I_W$, wherein a first amplitude of a third current in one of the U1-U2 coil, V1-V2 coil, or the W1-W2 coil is twice of a second amplitude of each of a fourth current and a fifth current of other two coils, and wherein a first direction of the third current is opposite to second directions of the fourth current and the fifth current.

2. The method of claim 1, wherein the indication trigger information indicates that a temperature of the battery pack is less than or equal to a threshold.

3. The method of claim 1, wherein the first current is a direct current or a harmonic current that generates pulsating magnetomotive force.

4. The method of claim 3, wherein the asynchronous motor is a three-phase asynchronous motor, wherein the direct current comprises $I_U$, $I_V$, and $I_W$ when the asynchronous motor is in a stationary state, wherein:
   $I_U = I$;
   $I_V = -aI$;
   $I_W = -bI$, and
   wherein a+b=1, wherein $I_U$, $I_V$, and $I_W$ are direct currents in the coils, and wherein a and b are constants.

5. The method of claim 1, wherein the asynchronous motor is a three-phase asynchronous motor, and wherein the first current comprises $I_U$, $I_V$, and $I_W$ when the asynchronous motor is in a stationary state.

6. The method of claim 5, wherein $I_U$, $I_V$, and $I_W$ are:

$$I_U = I\cos(\omega t + \theta_1);$$

$$I_V = -\frac{1}{2}I\cos(\omega t + \theta_1); \text{ and}$$

$$I_W = -\frac{1}{2}I\cos(\omega t + \theta_1),$$

wherein (ωt+θ) is the phase, with w being the angular frequency, and θ being the phase constant.

7. The method of claim 4, further comprising sequentially rotating, at a preset time interval, amplitudes of $I_U$, $I_V$, and $I_W$ and directions of $I_U$, $I_V$, and $I_W$.

8. The method of claim 1, wherein the asynchronous motor comprises an asynchronous drive motor or an asynchronous oil pump motor.

9. A system comprising:
   an asynchronous motor comprising a stator winding, wherein the asynchronous motor is a three-phase asynchronous motor comprising a U1-U2 coil, a V1-V2 coil, and a W1-W2 coil;
   a power system coupled to the asynchronous motor;
   a motor controller coupled to the power system and configured to:
   obtain indication trigger information;
   control, in response to the indication trigger information, the power system to inject a first current into the stator winding, wherein the first current comprises $I_U$, $I_V$, and $I_W$;
   generate, with the first current, heat without generating torque in the asynchronous motor; and
   control the power system to inject a second current into coils of the stator winding after superimposing with the first current when the asynchronous motor is in a running state, wherein a first amplitude of a third current in one of the U1-U2 coil, V1-V2 coil, or the W1-W2 coil is twice of a second amplitude of each of a fourth current and a fifth current of other two coils, and wherein a first direction of the third current is opposite to second directions of the fourth current and the fifth current;

a battery pack coupled to the motor controller; and a heat exchanger coupled to the asynchronous motor and the battery pack and configured to provide heating to the battery pack using the heat.

10. The system of claim 9, wherein the indication trigger information indicates that a temperature of the battery pack is less than or equal to a threshold.

11. The system of claim 10, wherein the first current is a direct current or a harmonic current that generates pulsating magnetomotive force.

12. The system of claim 11, wherein the direct current comprises $I_U$, $I_V$, and $I_W$ when the asynchronous motor is in a stationary state, wherein:

$I_U$=I;
$I_V$=−aI; and
$I_W$=−bI,
wherein a+b=1, wherein $I_U$, $I_V$, and $I_W$ are direct currents in the coils, and wherein a and b are constants.

13. The system of claim 12, wherein the motor controller is further configured to control the power system to sequentially rotate, at a preset time interval, amplitudes of $I_U$, $I_V$, and $I_W$ and directions of $I_U$, $I_V$, and $I_W$.

14. The system of claim 9, wherein the first current comprises $I_U$, $I_V$, and $I_W$ when the asynchronous motor is in a stationary state.

15. The system of claim 9, wherein $I_U$, $I_V$, and $I_W$ are:

$$I_U = I\cos(\omega t + \theta_1);$$

$$I_V = -\frac{1}{2}I\cos(\omega t + \theta_1); \text{ and}$$

$$I_W = -\frac{1}{2}I\cos(\omega t + \theta_1),$$

wherein (ωt+θ) is the phase, with w being the angular frequency, and θ being the phase constant.

16. The system of claim 9, wherein the asynchronous motor further comprises an asynchronous drive motor or an asynchronous oil pump motor.

17. A vehicle, comprising:
a coolant; and
a system comprising:
an asynchronous motor comprising a stator winding, wherein the asynchronous motor is coupled to the coolant, and wherein the asynchronous motor is a three-phase asynchronous motor comprising a U1-U2 coil, a V1-V2 coil, and a W1-W2 coil;

a power system coupled to the asynchronous motor;

a motor controller coupled to the power system and configured to:
obtain indication trigger information;
control, in response to the indication trigger information, the power system to inject a first current into the stator winding, wherein the first current comprises $I_U$, $I_V$, and $I_W$;
generate, with the first current, heat for the coolant without generating torque; and
control the power system to inject a second current into coils of the stator winding after superimposing with the first current when the asynchronous motor is in a running state, wherein a first amplitude of a third current in one of the U1-U2 coil, V1-V2 coil, or the W1-W2 coil is twice of a second amplitude of each of a fourth current and a fifth current of other two coils, and wherein a first direction of the third current is opposite to second directions of the fourth current and the fifth current;

a battery pack coupled to the motor controller; and a heat exchanger coupled to the battery pack and the asynchronous motor and configured to provide heating to the battery pack using the heat provided to the coolant.

18. The vehicle of claim 17, wherein the indication trigger information indicates that a temperature of the battery pack is less than or equal to a threshold.

19. The vehicle of claim 17, wherein the indication trigger information indicates that a temperature of the battery pack is less than or equal to a threshold.

20. The vehicle of claim 17, wherein the first current is a direct current or a harmonic current that generates pulsating magnetomotive force.

* * * * *